United States Patent
Houck et al.

(10) Patent No.: US 11,938,670 B2
(45) Date of Patent: Mar. 26, 2024

(54) POWDER COATED VACUUM FORMED ARTICLES

(71) Applicant: GM Global Technology Operations LLC, Detroit, MI (US)

(72) Inventors: Thomas E. Houck, Bloomfield Hills, MI (US); Martin Aaron Butkovich, Ray Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 176 days.

(21) Appl. No.: 17/463,776

(22) Filed: Sep. 1, 2021

(65) Prior Publication Data

US 2023/0069556 A1    Mar. 2, 2023

(51) Int. Cl.
| | | |
|---|---|---|
| *B29C 51/10* | (2006.01) | |
| *B29C 51/14* | (2006.01) | |
| *B29C 51/26* | (2006.01) | |
| *B29K 105/00* | (2006.01) | |
| *B29L 31/30* | (2006.01) | |

(52) U.S. Cl.
CPC .............. *B29C 51/10* (2013.01); *B29C 51/14* (2013.01); *B29C 51/264* (2013.01); *B29C 2791/006* (2013.01); *B29K 2105/0032* (2013.01); *B29K 2995/002* (2013.01); *B29L 2031/3005* (2013.01)

(58) Field of Classification Search
CPC ...... B29K 2995/002; B29K 2105/0032; B29C 2791/006; B29C 51/10; B29C 51/14
See application file for complete search history.

(56) References Cited

U.S. PATENT DOCUMENTS

| | | | |
|---|---|---|---|
| 2008/0145624 A1 | 6/2008 | Weikard et al. | |
| 2016/0151958 A1* | 6/2016 | Houck | B29C 51/34 |
| | | | 264/550 |
| 2018/0362803 A1* | 12/2018 | Kikuchi | C08J 7/046 |

FOREIGN PATENT DOCUMENTS

| | | | |
|---|---|---|---|
| DE | 4230229 A1 * | 3/1994 | ............. B29C 51/14 |
| DE | 4230229 A1 | 3/1994 | |

OTHER PUBLICATIONS

German Office Action for German Application No. 10 2022 119 821.9; dated Nov. 24, 2022 (pp. 1-3).

* cited by examiner

*Primary Examiner* — Seyed Masoud Malekzadeh
*Assistant Examiner* — Timothy G Hemingway
(74) *Attorney, Agent, or Firm* — CANTOR COLBURN LLP

(57) ABSTRACT

A method of forming a thermoplastic plastic component includes applying an amount of pigmented powder to a sheet of thermoplastic, heating the sheet of thermoplastic to a selected temperature, melting the amount of pigmented powder on the sheet of thermoplastic to form a coating, re-heating the sheet of thermoplastic to another selected temperature, positioning the sheet of thermoplastic over a pattern, and vacuum forming the sheet of thermoplastic to form the sheet of thermoplastic into the pattern.

10 Claims, 1 Drawing Sheet

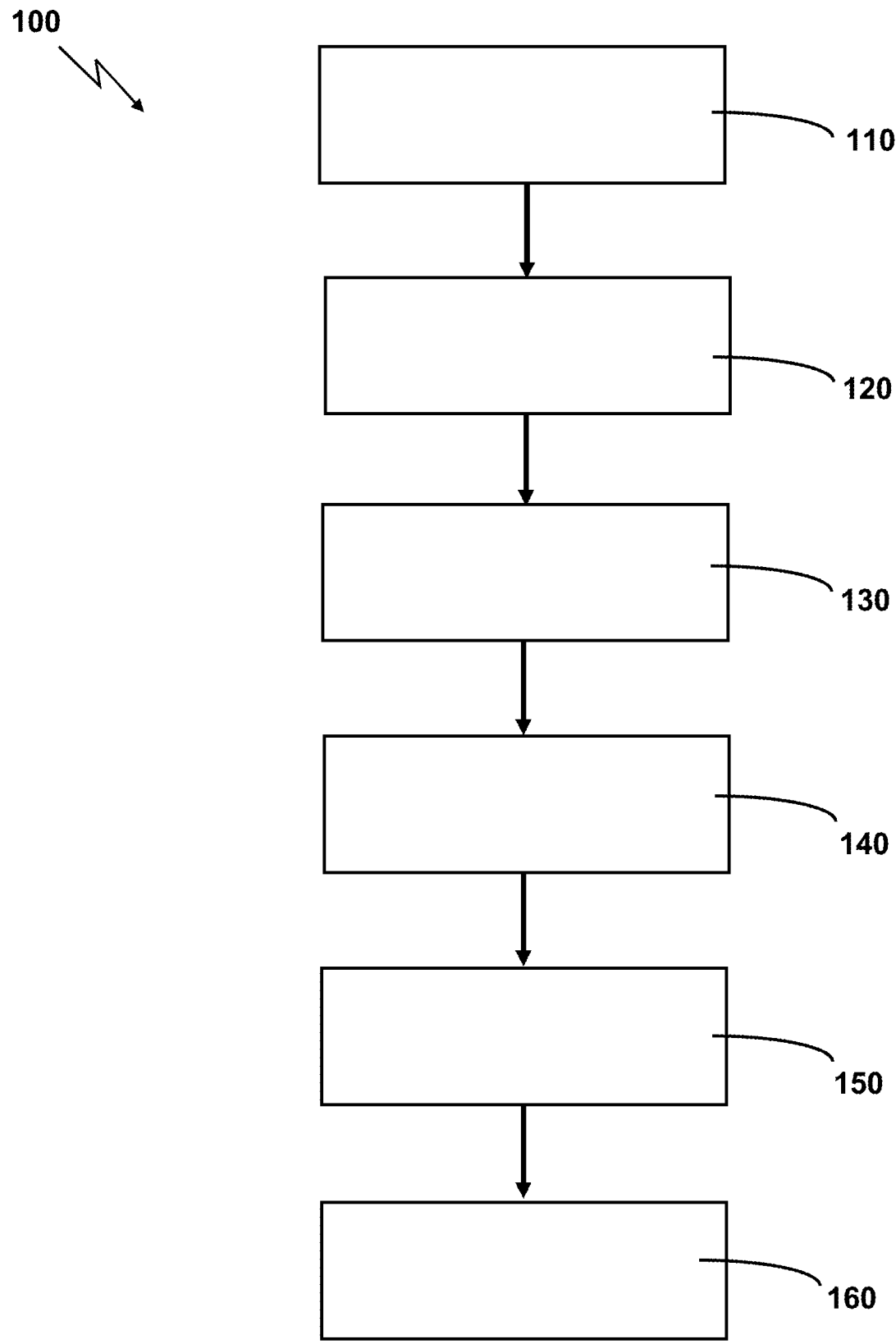

POWDER COATED VACUUM FORMED ARTICLES

INTRODUCTION

The subject disclosure relates to the art of plastic forming and, more particularly, to powder coating thermoplastic articles.

Plastic parts are ubiquitous in modern manufacturing. Plastic may take on various forms and come in a wide range of colors. For example, plastic components may be injection molded or vacuum formed into shapes that are easy to manufacture. The automotive industry employs plastic in a wide array of applications including trim components, body components, and the like. With certain plastics, custom colors may be achieved by powder coating.

Vacuum formed parts are also available in a wide range of colors. Purchasing custom colors in plastic may require a high volume purchase and thereby be economically unfeasible. In such circumstances, custom colors are typically achieved by a painting process. Painting may provide a desired custom color, but a painted product may be prone to damage. That is, a painted surface may be easily marred. Accordingly, it is desirable to provide robust custom color options for vacuum formed components.

SUMMARY

Disclosed is a method of forming a thermoplastic plastic component including applying an amount of pigmented powder to a sheet of thermoplastic, heating the sheet of thermoplastic to a selected temperature, melting the amount of pigmented powder on the sheet of thermoplastic to form a coating, re-heating the sheet of thermoplastic to another selected temperature, positioning the sheet of thermoplastic over a pattern, and vacuum forming the sheet of thermoplastic to form the sheet of thermoplastic into the pattern.

In addition to one or more of the features described above or below, or as an alternative, further embodiments could include heating the sheet of thermoplastic to the selected temperature prior to applying the amount of pigmented powder.

In addition to one or more of the features described above or below, or as an alternative, further embodiments could include wherein heating the sheet of thermoplastic to the selected temperature includes heating the sheet of thermoplastic to a temperature of about 185° F. (85° C.).

In addition to one or more of the features described above or below, or as an alternative, further embodiments could include wherein applying the amount of pigmented powder includes applying a plastic powder including a polyester material, cross-linking agents, and a selected pigment.

In addition to one or more of the features described above or below, or as an alternative, further embodiments could include wherein further heating the sheet of thermoplastic melts the plastic powder.

In addition to one or more of the features described above or below, or as an alternative, further embodiments could include allowing the sheet of thermoplastic to cool after vacuum forming before removing from the pattern.

In addition to one or more of the features described above or below, or as an alternative, further embodiments could include wherein reheating the sheet of thermoplastic includes heating the sheet of thermoplastic to a temperature of between about 225° F. (107° C.). and about 275° F. (135° C.).

In addition to one or more of the features described above or below, or as an alternative, further embodiments could include holding the sheet of thermoplastic in a substantially planar orientation while heating to the selected temperature.

In addition to one or more of the features described above or below, or as an alternative, further embodiments could include wherein reheating the sheet of thermoplastic includes maintaining the sheet of thermoplastic at the selected temperature for a selected time period.

In addition to one or more of the features described above or below, or as an alternative, further embodiments could include cooling the sheet of thermoplastic before reheating.

In addition to one or more of the features described above or below, or as an alternative, further embodiments could include wherein cooling the sheet of thermoplastic includes maintaining the sheet of thermoplastic in a substantially flat configuration.

Also disclosed is a vehicle comprising a plastic component formed by the method disclosed herein.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

The FIGURE is a flow chart depicting a method of powder coating a vacuum form article.

DETAILED DESCRIPTION

The following description is merely exemplary in nature and is not intended to limit the present disclosure, its application or uses. It should be understood that throughout the drawings, corresponding reference numerals indicate like or corresponding parts and features.

It is often desirable to apply custom colors to plastic pieces. The custom color may be selected to match, for example, a specific interior for a vehicle. Often times, it is desirable to employ vacuum formed plastic in custom colors in various vehicle systems. Vacuum formed plastic, as opposed to injection molded plastic, may be readily formed into complex shapes, and used as trim pieces, both externally and internally to the vehicle.

The FIGURE depicts a method 100 of forming powder coated vacuum formed plastic articles that may be used in vehicle manufacturing and the like. In block 110, a sheet of thermoplastic is placed in an oven and heated to a selected temperature. In a non-limiting example, the selected temperature may be about 185° F. (85° C.). The sheet of thermoplastic may take the form of acrylonitrile butadiene styrene (ABS) plastic, polypropylene, polyethylene, polyvinylchloride, polystyrene, polyethylenetheraphthalate, polycarbonate, or the like. The sheet of thermoplastic is held in a substantially planar configuration at the selected temperature for a selected time. That is, the sheet of thermoplastic is maintained substantially flat.

In block 120, the sheet of thermoplastic is removed from the oven and coated with an amount of pigmented powder. In a non-limiting example, the pigmented powder takes the form of a plastic powder. The plastic powder may include a polyester material, a resin(s), and/or a cross-linking agent. The plastic powder may be applied by hand or through the use of a spray gun that does not include an electro-static process. Normally, when powder coating metal an electrostatic process is used to attract the powder to the metal surface to evenly distribute the powder. This is not the case with plastic. That is, as plastic already has a static charge in it, the powder will not distribute evenly. Thus, in a non-limiting example, the plastic powder may be carried in an air stream from the spray gun to the sheet of thermoplastic. By eliminating the electrostatic process, the plastic powder does not adhere to the sheet of thermoplastic through the electrostatic process, but rather through direct melting on a preheated surface. During application, the sheet of thermoplastic may be in a horizontal orientation, a vertical orientation, or any orientation between horizontal and vertical.

In block 130, the sheet of thermoplastic, now coated with plastic powder is returned to the oven and is heated at the selected temperature such as about 185° F. (85° C.). The selected temperature ensures that the plastic powder will melt, and flow, but not completely cure. In a non-limiting example, the plastic powder possesses a melting point of between about 130° F. (54.5° C.) and about 140° F. (60° C.). The sheet of thermoplastic coated with plastic powder may be heated at the selected temperature for a selected time period. In a non-limiting example, the selected time period may be about 5 minutes to form a bonded powder coating.

In block 140, the sheet of thermoplastic, including the bonded powder coating is reheated to a second or another selected temperature. In a non-limiting example, the another selected temperature is between about 225° F. (107° C.). and about 275° F. (135° C.). The sheet of thermoplastic may be held at the second selected temperature until, for example, drooping is observed. Dropping should be understood to include a sagging of outer portions of the sheet of thermoplastic. Drooping denotes a state in which the sheet of thermoplastic is pliable.

In block 150, the sheet of thermoplastic, now in a pliable state, is placed over a form or pattern that reflects a selected component. The plastic is either lowered down to the pattern or the pattern is raised up into the plastic. This creates a seal for the vacuum to be applied to force the plastic to take the shape of the pattern. At this point, in block 160, the sheet of thermoplastic is held against the pattern until cooled. Once cooled and the pattern set, the sheet of thermoplastic may be removed from the pattern. In a non-limiting example, the pattern forms a vehicle component from the sheet of thermoplastic.

At this point, it should be understood that the non-limiting examples described herein outline a method for achieving custom colors on vacuum formed parts. That is, instead of having to source a supply of custom colored thermoplastic, the example embodiments describe a method of achieving a custom color on a vacuum formed part easily, efficiently, and for much lower cost than sourcing a supply of custom colored thermoplastic stock.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of forming a thermoplastic plastic component comprising: introducing a sheet of thermoplastic into an oven; heating the sheet of thermoplastic to a selected temperature in the oven; removing the sheet of thermoplastic from the oven and applying an amount of pigmented powder to the sheet of thermoplastic; returning the sheet of thermoplastic coated with the amount of pigmented powder back to the oven; heating the sheet of thermoplastic and the amount of pigmented powder in the oven; bonding the pigmented powder to the sheet of thermoplastic by melting and partially curing the amount of pigmented powder on the sheet of thermoplastic to form a bonded coating of pigmented powder in the oven; re-heating the sheet of thermoplastic and the bonded coating of pigmented powder to another selected temperature; positioning the sheet of thermoplastic over a pattern in a vacuum forming system; and vacuum forming the sheet of thermoplastic after bonding the pigmented powder to form the sheet of thermoplastic into the pattern.

2. The method of claim 1, wherein heating the sheet of thermoplastic to the selected temperature includes heating the sheet of thermoplastic to a temperature of about 185° F. (85° C.).

3. The method of claim 1, wherein applying the amount of pigmented powder includes applying a plastic powder including a polyester material, cross-linking agents, and a selected pigment.

4. The method of claim 1, further comprising allowing the sheet of thermoplastic to cool after vacuum forming before removing from the pattern.

5. The method of claim 1, wherein reheating the sheet of thermoplastic includes heating the sheet of thermoplastic to a temperature of between about 225° F. (107° C.) and about 275° F. (135° C.).

6. The method of claim 1, further comprising holding the sheet of thermoplastic in a substantially planar orientation while heating to the selected temperature.

7. The method of claim 1, wherein reheating the sheet of thermoplastic includes maintaining the sheet of thermoplastic at the selected temperature for a selected time period.

8. The method of claim 1, further comprising cooling the sheet of thermoplastic before reheating.

9. The method of claim 8, wherein cooling the sheet of thermoplastic includes maintaining the sheet of thermoplastic in a substantially flat configuration.

10. A vehicle comprising a plastic component formed by the method of claim 1.

* * * * *